United States Patent
Heirman

(10) Patent No.: US 7,275,737 B2
(45) Date of Patent: Oct. 2, 2007

(54) DEVICE FOR SIMULTANEOUSLY COOLING AND REMOVING LIQUID FROM A GAS FROM A COMPRESSOR

(75) Inventor: Peter Jozef Heirman, Meise (BE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 21 days.

(21) Appl. No.: 10/534,112

(22) PCT Filed: Nov. 13, 2003

(86) PCT No.: PCT/BE03/00195

§ 371 (c)(1),
(2), (4) Date: May 6, 2005

(87) PCT Pub. No.: WO2004/045746

PCT Pub. Date: Jun. 3, 2004

(65) Prior Publication Data

US 2006/0113689 A1 Jun. 1, 2006

(30) Foreign Application Priority Data

Nov. 18, 2002 (BE) ................................. 2002/0652

(51) Int. Cl.
*B01F 3/04* (2006.01)
(52) U.S. Cl. ............... 261/152; 261/156; 261/157; 261/160; 96/290; 96/300
(58) Field of Classification Search ........... 261/127, 261/146, 148, 149, 151, 152, 154, 156, 157, 261/160, 161; 96/290, 295, 296, 298, 300
See application file for complete search history.

(56) References Cited

U.S. PATENT DOCUMENTS

| | | | |
|---|---|---|---|
| 2,079,562 A * | 5/1937 | Olson et al. | 165/60 |
| 3,621,652 A * | 11/1971 | Demaree | 60/277 |
| 3,714,790 A | 2/1973 | Battey | |
| 3,810,346 A | 5/1974 | Uratani | |
| 3,947,146 A | 3/1976 | Schuster | |
| 4,420,317 A | 12/1983 | Stewart | |
| 4,598,766 A * | 7/1986 | Michalak et al. | 165/104.16 |
| 6,145,818 A * | 11/2000 | Herbst | 261/154 |
| 6,470,693 B1 | 10/2002 | Dickey | |

FOREIGN PATENT DOCUMENTS

EP 0120547 10/1984

* cited by examiner

*Primary Examiner*—Scott Bushey
(74) *Attorney, Agent, or Firm*—Bacon & Thomas, PLLC

(57) ABSTRACT

Device for simultaneously cooling and removing liquid from compressed gas of a compressor element (1) or of several compressor elements (1) which are connected either or not in parallel or in series, which device includes a pressure vessel (2) which is provided with a liquid drain (8) at the bottom, an inlet (6) for compressed gas at a distance above the latter and an outlet (18) for compressed gas at the top, latter and an outlet (18) for compressed gas at the top, characterized in that a distribution device (4) is provided in the pressure vessel (2), between the inlet (6) and the outlet (18) for the compressed gas, for spreading a cool fluid in direct contact with the compressed gas, and in that a heat exchanger (5) is provided in the pressure vessel (2) for heating the compressed gas which has been cooled by the cool fluid.

13 Claims, 2 Drawing Sheets

DEVICE FOR SIMULTANEOUSLY COOLING AND REMOVING LIQUID FROM A GAS FROM A COMPRESSOR

BACKGROUND OF THE INVENTION

A. Field

The present invention concerns a device for simultaneously cooling and removing liquid from compressed gas of a compressor element or of several compressor elements which are connected either or not in parallel and/or in series, which device comprises a pressure vessel erected in the compressed air line and which is provided with a liquid drain at the bottom, an inlet for compressed gas at a distance above the latter and a gas outlet at the top.

B. Related Art

In a liquid-injected compressor element is injected water, oil or another liquid in the inlet air or in the rotor chamber for lubrication, cooling and sealing. The liquid is discharged together with the compressed gas and subsequently separated in a pressure vessel and cooled in a heat exchanger, after which it is injected again in the compressor element.

When a gas, comprising vapours such as water vapour, is compressed and subsequently cooled, it may contain less of these vapours as the relative contribution of the vapour pressure of these vapours to the total pressure decreases. In many cases, this results in the compressed gas being saturated with these vapours and a part of the vapours being condensed during the cooling of the compressed gas.

For many applications, the presence of condensate in the compressed gas is very detrimental and the risk of damage is large when the gas is saturated with vapour. That is why a condensate separator is provided in compressors following the gas cooler, as well as an extra gas drier in many cases, i.e. a device for lowering the partial pressure of the vapour in the compressed gas. This gas drier in many cases consists of a gas cooler which cools the gas to the required dew point of the vapours and an extra condensate separator after which the gas is heated again.

From European patent 0,120,547, such a gas drier is known in which compressed air is dried in this case by means of direct contact with icy water which bubbles up.

The disadvantage of this gas drier is that the heat transfer is not very efficient and that moreover ice can be formed, which results in a large thermal resistance being built up which makes sure that the energy is used even less efficiently.

Another disadvantage of the gas drier from EP 0,120,547 is that use is made of an all-air heat exchanger which is inherently characterised by a high pressure drop in relation to the recycled energy.

A disadvantage of gas coolers in general is that they have to resist the high pressure of the compressed gas, that they are relatively expensive and cause a relatively large pressure loss of the compressed gas.

Condensate separators are either a relatively major source of pressure loss of the compressed gas, or they are not very efficient. This is all the more true when the flow of the compressed gas can strongly vary, as is for example the case with compressors with a variable rotational speed.

The heat exchangers of gas driers have to resist the high pressure of the compressed gas, they are voluminous and relatively expensive. These heat exchangers, as well as the condensate separators of gas driers are a relatively major source of pressure loss for the compressed gas.

Moreover, the assembled device of the gas cooler, condensate separator and gas drier requires several connecting pipes which further increase the cost price of the device, as well as the pressure loss of the compressed gas.

SUMMARY OF THE INVENTION

The invention aims a device for cooling the compressed gas of a compressor and for simultaneously removing condensate from the compressed gas, and for subsequently heating the compressed gas, which does not have these disadvantages and allows for a very efficient and fine cooling and condensate removal, causing little pressure loss of the compressed gas and which is also considerably more compact and cheaper than existing devices.

This aim is reached according to the invention by providing a distribution device in the pressure vessel, between the inlet and the outlet of the compressed gas, from where a cool fluid is spread in the compressed gas while being in direct contact with it, and by providing a heat exchanger in the pressure vessel for heating the compressed gas which has been cooled by the cool fluid.

Thanks to the direct contact between the cool fluid and the hot, compressed gas, the latter is cooled, as a result of which vapours present in the gas will condense. The gas is thus simultaneously cooled, and vapours are separated as condensate which flows down together with the cool fluid, where it is collected at the bottom of the pressure vessel.

The cool fluid is cooled thereby to a temperature which is preferably 20K or more lower than the temperature of the compressed gas on the outlet of the device. By heating the compressed gas again after the direct contact with this cool fluid by means of the above-mentioned heat-exchanger in the pressure vessel, dry compressed gas is obtained with a dew point which is about 3K higher than the coldest temperature of the cool fluid.

The compressed gas and the cool fluid preferably flow vertically counterflow, since the best heat exchange and mass transfer are thus obtained.

The direct contact between compressed gas and cool fluid can be obtained in all sorts of ways, such as, but non restrictive, by spraying or atomizing the cool fluid in the compressed gas, or by letting the cool fluid flow over or through a contactor, whereby this contactor is preferably formed of a mass with an open structure, either or not porous; or is formed of stacked parts, either or not porous, which are either or not stacked according to a regular pattern; or is formed of dishes with openings, as used for distillation, over which the cool fluid flows and whereby the compressed gas flows through the holes; or is formed of a combination of different ways.

The effect of the direct contact is also better as, firstly, the contact surface between cool fluid and compressed gas is larger, and secondly, a good mixing of the gas is realised, for example by means of turbulent flow, and thirdly the ratio of the gas flow and the fluid flow is identical everywhere.

The flow of the cool fluid can be freely selected. It is preferably selected as low as possible, such that the temperature of the cool fluid, after the direct contact with the compressed gas, is between 0 K and 5 K higher than the temperature of the compressed gas before the direct contact.

In order to obtain compressed gas which is free of condensate, it is important that, after the direct contact with the cool fluid, the gas contains as little drops as possible of the cool fluid or of the condensate. This is preferably realised by meeting the following restriction:

$$C_f = V_g \sqrt{\frac{\rho_g}{\rho_v - \rho_g}} \leq 0.1 \frac{m}{s}$$

Whereby $V_g$ is the effective gas velocity, $\rho_g$ is the density of the gas and $\rho_v$ is the density of the cool fluid mixed with the condensate. The condensate separation is further improved by making the gas flow through a demisting device which is integrated in the pressure vessel above the distribution device of the cool fluid.

The cool fluid can be freely selected. If, however, its composition is identical to the composition of the condensate, the device will be simpler and cheaper as it is not required then to separate the cool fluid from the condensate.

In order to dry the compressed air, it is preferably heated by means of a heat exchanger which is erected at the top in the pressure vessel. Especially in this embodiment, the device is very compact. The heat required to this end is preferably abstracted from the cool fluid, so that less external cooling is required to cool the cool fluid before it makes direct contact with the compressed gas. Especially in the embodiment, built-in in the pressure vessel, and with the cool fluid as a heat source, this heat exchanger is much cheaper as no extra pressure-resistant casing is required, and the design pressure of this heat exchanger can moreover be low as it is not determined by the gas pressure but only by the hydrodynamic pressure drop in the circuit of the cool fluid.

In the case of integrated gas drying, the pressure vessel is preferably insulated. This can be done internally in the pressure vessel, but it is preferably done externally in order to avoid compression in the case of closed-cell insulation or in order to avoid humidification in the case of open-cell insulation.

The above-described device according to the invention can be applied to compressors with one or several compression elements in parallel, as well as to compressors with several elements placed in series. In the case of several elements in series, the device is preferably provided following the highest pressure stage, as the device is most compact then.

DESCRIPTION OF THE DRAWINGS

In order to better explain the characteristics of the invention, the following preferred embodiments of an air compressor equipped with a device for the cooling and water removal and of such a device according to the invention are described as an example only without being limitative in any way, with reference to the accompanying drawings, in which.

DETAILED DESCRIPTION OF PREFERRED EMBODIMENTS

Figure 1:
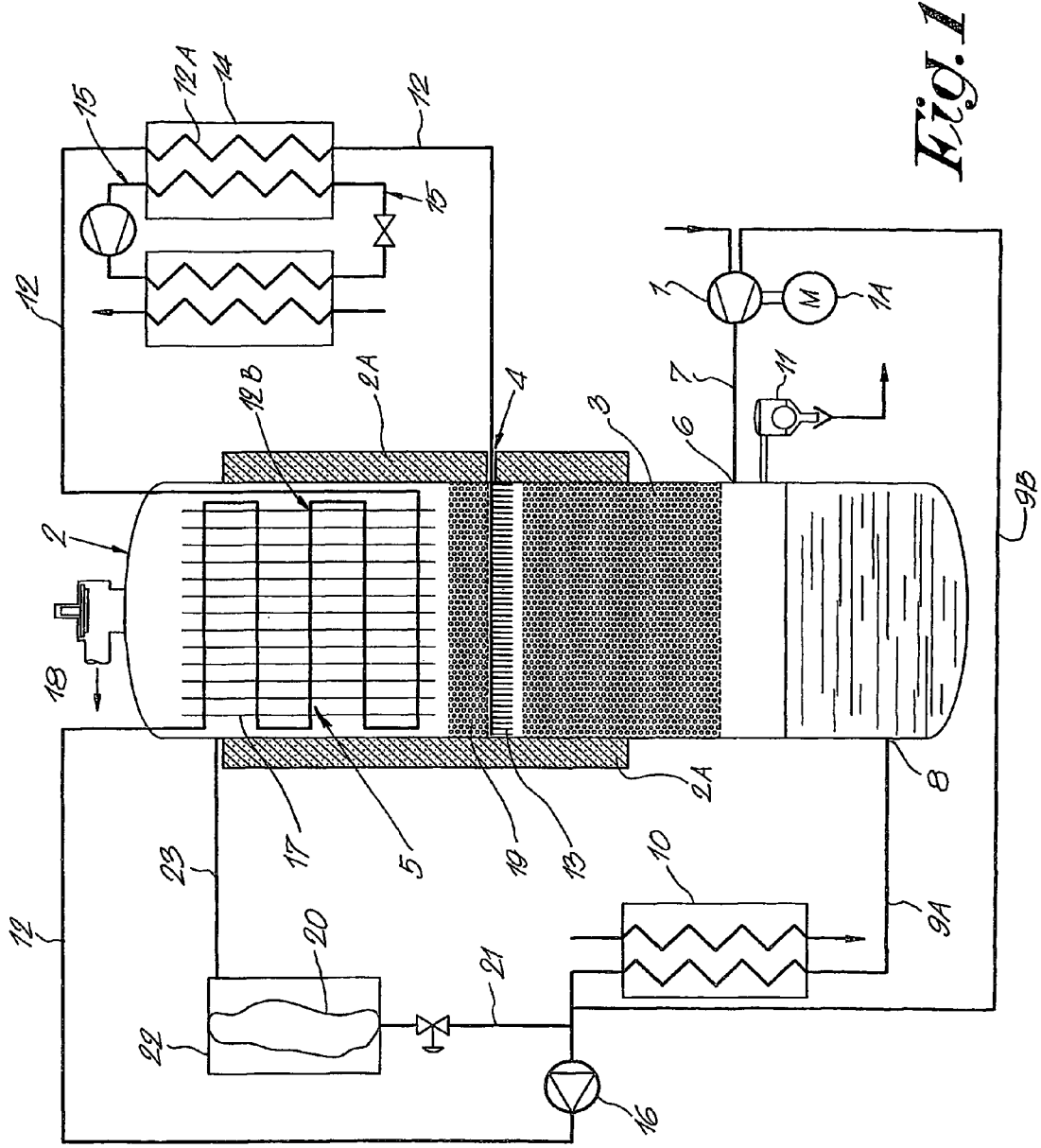
FIG. 1 schematically represents a water-injected air compressor, equipped with a device for the cooling and water removal according to the invention.

FIG. 1 represents a compressor with a screw compressor element 1, driven by a motor 1A, and a device for the cooling and liquid removal connected thereto, in particular water removal from the compressed gas, especially compressed air.

This device mainly comprises a pressure vessel 2 with insulation 2A with means in it to guarantee a direct contact between the compressed air and the cool medium, preferably water, which means consist of a contactor 3 and a water distribution device 4, and further, in the case of gas drying, also a heat exchanger 5 for re-heating the gas cooled in the contactor 3.

The pressure vessel 2 is a cylindrical, standing vessel with, at a distance above the bottom, an inlet 6 for compressed air which is connected to the outlet of the compressor element 1 by means of a compressed air line 7.

At the bottom, this pressure vessel is provided with a water drain 8 consisting of two parts 9A and 9B, with a heat exchanger 10 in between, which is connected to the injection system of the compressor element 1 by means of a return line. This counterflow heat exchanger 10 cools the water with cooling water. In another embodiment, the heat exchanger 10 may comprise a fan cooling the water with cool ambient air.

Between the water drain 8 and the inlet 6 is connected a water separator 11 to the pressure vessel 2 above a certain level for discharging excess water.

The above-mentioned contactor 3 is situated above the inlet 6, over the entire diameter of the pressure vessel 2. It consists of a foam with an open-cell structure, causing a small pressure drop of the gas.

This open-cell foam is inert to compressed air and water and preferably causes a turbulent flow of the gas through the contactor 3. It is preferably absorbing, like a sponge, and preferably has a large surface per volume which can be moistened. The contactor 3 is either homogenous, such that the creation of preferential paths for the gas and the water is avoided, or it is inhomogeneous in a systematic way, such that the water and the compressed air flow along the same paths under all circumstances.

Instead of being made of foam, according to a variant, the contactor 3 may consist of a pile of loose, either or not porous particles which are either or not piled according to a regular pattern.

According to yet another variant, the contactor 3 can be replaced partially or as a whole by dishes, as used for distillation.

According to yet another variant, the bed 3 may consist partially or as a whole of a vertical prismatic structure of tubes, for example in the shape of a honeycomb.

The distribution device 4 consists for example of a tube provided with nozzles or sprinklers 13 situated right above the contactor 3, and it is connected to the return line 9 by means of a pipe 12, which extends over a cooler 14 and the above-mentioned cooler 5 in the case of gas drying.

In the given example, the cooler 14 is a heat exchanger whose primary part consists of the evaporator of a cooling circuit 15 and whose secondary part is formed by a part 12A of the pipe 12. This cooling circuit 15 may have a conventional construction comprising also a compressor and a condenser apart from said evaporator.

In the given example, the cooler 5 is a heat exchanger consisting of a part 12B of the pipe 12 extending to and fro through the top part of the pressure vessel 2, provided with external lamellas 17 for improving the heat exchange with the compressed air. The cooler 5 can also be another type of heat exchanger and it may also be situated outside the pressure vessel 2.

In the pipe 12 is erected a pump 16 for the circulation of the water through coolers 5 and 14 and for distributing the water over the contactor 3 via the distribution device 4.

Above the heat exchanger 5, the pressure vessel 2 is provided with an outlet 18 for compressed air.

Above the distribution device 4 can be erected a demisting device 19 which may consist of a bed of particles on a grate.

The above-described device works as follows.

Compressed air loaded with liquid is pressed through the compressor element 1 via the compressed air line 7 in the lower zone of the pressure vessel 2. The diameter of the pressure vessel 2 is such that the velocity of the gas in this zone drops to such a low value that the largest amount of the water drops in the compressed air precipitates as a result of gravitation. This water is collected at the bottom of the pressure vessel 2. The pressure difference between the pressure vessel 2 and the air inlet of the compressor element 1 pushes said water back to the injection system of the compressor element 1 via the return line 9. In the cooler 10, the compression heat is removed from said water.

Part of said water is diversed through the pipe 12 by means of the pump 16 and pumped over the heat exchanger 5 to the cooler 14, where it is cooled to for example 23 K below the ambient air by the cooling circuit 15, and from there on to the sprinklers 13 which sprinkle the cooled water on the contactor 3.

By adding an antifreeze to the water, the water can be cooled to a temperature below 0° C. A semi-permeable membrane or another separation technique for the water separator 11 can prevent antifreeze from getting spilled with the overflowing water.

This cooled water moistens the contactor 3 and makes contact with the compressed air flowing up from the aforesaid lower zone which is strongly cooled by this water. Water vapour in this compressed air condenses, and the condensate flows down together with the water, where it is collected at the bottom of the pressure vessel 2.

Possibly remaining mist in the compressed air is removed in the demisting device 19.

The strongly cooled compressed air flows further up through the heat exchanger 5, where it is heated again, such that dry compressed air is obtained at the outlet 18 with a water dew point of about 20K below the ambient air temperature.

The water which is supplied to the distribution device 4 and which is distributed on the contactor 3 by the latter, is cooled in three steps: first in the heat exchanger 10 and then, in the case of gas drying, in the heat exchanger 5 and in the cooler 14.

The device is very compact and, thanks to the turbulent flows in the contactor 3 and thanks to the low gas velocities, it is prevented that water drops are carried along with the compressed air.

The foam or the particles of the contactor 3 can be coated with a biocide or they can be a biocide themselves or contain a biocide. Thus can be avoided biological contamination of the water and of the compressed air.

It is also possible to inject a biocide in the water.

This biocide can for example be distributed from a flexible bag 20 which is connected to the pipe 12, via a pipe 21 which can be sealed, upstream of the pump 16, and which is erected in a closed reservoir 22 which is connected to the top side of the pressure vessel 2 by means of a pipe 23. The pressure difference between the top side of the pressure vessel 2 and the pipe 12 is relatively small, when there is not any water flowing through the pipe, since there is no pressure drop over the heat exchanger 10 then, as a result of which there is no injection of biocide when the compressor element 1 is not working.

Although, in the above-described embodiment, the above-mentioned means for guaranteeing the direct contact between the compressed air and the cool medium comprise a contactor 3, it is not excluded, according to a variant which is not represented, not to apply a contactor 3, but for the cool medium to be atomized directly from the distribution device 4 into the space of the pressure vessel 2 so as to make direct contact with the compressed air in this space.

Figure 2:
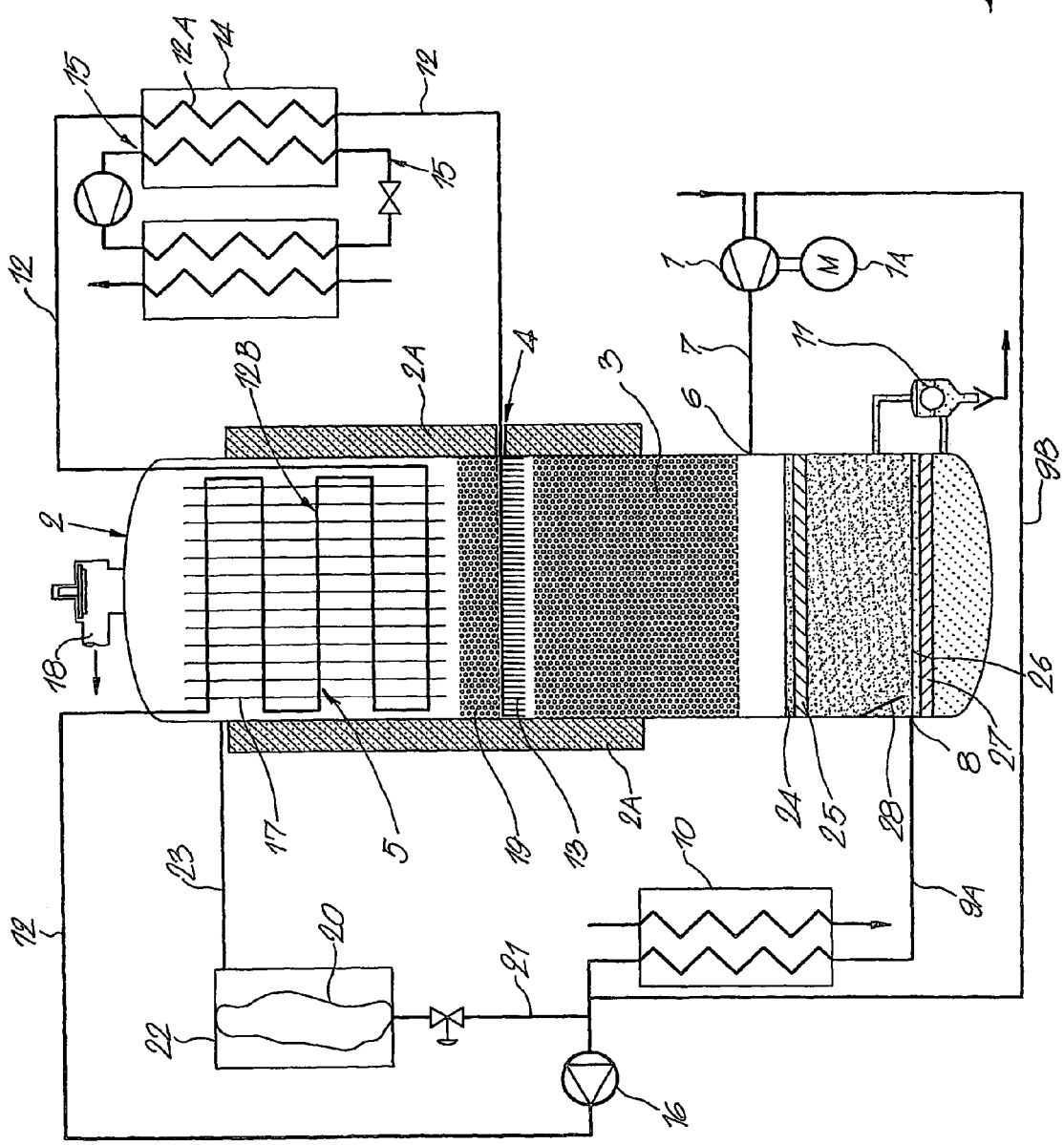
FIG. 2 schematically represents an oil-injected air compressor, equipped with a device for the cooling and removal of water and oil according to the invention.

The embodiment of the compressor, represented in FIG. 2, differs from the above-described embodiment represented in FIG. 1 in that it is oil-injected instead of water-injected.

This means that two liquids, namely oil and water, have to be removed from the compressed gas, in particular the compressed air.

Therefore, the lower part of the pressure vessel 2 deviates somewhat from the preceding embodiment.

Right beneath the oil level 24 in the pressure vessel 2 is erected a hydrophilic coalescence filter 25 for collecting small water drops and for bonding them into larger drops. The water is collected at the bottom, up to underneath the phase limit 26. Underneath the phase limit 26 is erected an oleophilic coalescence filter 27 to prevent oil from ending up in the water.

The part 9A of the return line 9A-9B is connected to the pressure vessel 2 above the phase limit 26, and opposite to the connection is provided a screening plate 28 to prevent water drops from being carried along.

The water separator 11 is also a float separator, but the density of its float is situated between that of the water and that of oil. The float separator 11 connects with its top side to the collected oil, between the coalescence filter 25 and the phase limit 26, and with its bottom side to the collected water, under the coalescence filter 27.

An emulsion-breaking additive is added to the oil.

The working is analogous to what has been described with reference to FIG. 1, with this main difference that mainly oil is separated from the compressed air by the gravitational separation at the bottom of the pressure vessel 2, and that the liquid which is cooled in the cooler 14 and provided on the bed 3 by the distribution device 4, is also oil instead of water.

Finer oil particles which are being held up by the contactor 3 and water vapour which is being condensed by cold oil flowing down over the contactor 3 flow down.

Underneath the liquid level, the oil and the water are separated. Only oil is discharged via the return line 9A-9B.

The cooler 14, just as the heat exchanger 5, can be provided in the pressure vessel 2.

The invention is by no means limited to the above-described embodiments given as an example and represented in the accompanying drawings; on the contrary, such a device for simultaneously cooling and removing liquid from the gas of a compressor element can be made in all sorts of variants while still remaining within the scope of the invention.

The invention claimed is:

1. Device for simultaneously cooling and removing liquid from compressed gas of at least one compressor element, comprising a pressure vessel provided with a liquid drain at a bottom thereof, an inlet for compressed gas at a distance above the latter and an outlet for compressed gas at a top thereof, wherein a distribution device is provided in the pressure vessel between the inlet and the outlet for the compressed gas, said distribution device arranged so as to spread a cool fluid in direct contact with the compressed gas, and including a heat exchanger in the pressure vessel arranged to heat compressed gas which has been cooled by the cool fluid;
   wherein the distribution device for cool fluid comprises a pipe opening onto a contactor in the pressure vessel and extending over a cooler;
   wherein a part of the pipe of the distribution device is part of the heat exchanger to enable re-heating the gas.

2. Device according to claim 1, wherein the cool fluid is spread in counterflow relationship with respect to the flow of compressed gas.

3. Device according to claim 1, wherein the contactor is provided between the inlet and the distribution device.

4. Device according to claim 1, wherein the contactor comprises a pile of loose particles.

5. Device according to claim 1, wherein the contactor comprises a mass with an open structure.

6. Device according to claim 1, wherein the contactor comprises dishes.

7. Device according to claim 1, wherein the contactor comprises a combination of different types of contactors.

8. Device according to claim 1, wherein the heat exchanger arranged to heat the gas is located at a top area of pressure vessel.

9. Device according to claim 1, wherein the cooler is a heat exchanger whose primary part is part of a cooling circuit and whose secondary part is a part of the pipe.

10. Device according to claim 1, wherein the pipe of the distribution device connects to a return line of a water drain of the pressure vessel to an injection system of the compressor element.

11. Device according to claim 10, including a cooler located in the return line.

12. Device according to claim 1, including a demisting device in the pressure vessel above the contactor.

13. Device according to claim 1, wherein the heat exchanger and the contactor are thermally insulated and in that the insulation is provided on the outside of the pressure vessel.

* * * * *